United States Patent [19]

Maeda et al.

[11] Patent Number: 5,095,049

[45] Date of Patent: Mar. 10, 1992

[54] PROCESS FOR PRODUCING A LOW-PARTICLE-CONTENT TRANSPARENT THERMOPLASTIC RESIN SOLUTION

[75] Inventors: Kenji Maeda, Osaka; Toshikazu Umemura, Hyogo; Yuki Ohtani, Kyoto; Takeaki Megumi, Osaka, all of Japan

[73] Assignee: Mitsubishi Gas Chemical Co., Inc., Tokyo, Japan

[21] Appl. No.: 153,674

[22] Filed: Feb. 8, 1988

Related U.S. Application Data

[63] Continuation-in-part of Ser. No. 6,203, Jan. 23, 1987, abandoned.

[30] Foreign Application Priority Data

Jan. 23, 1986 [JP] Japan .................................. 61-10969
May 24, 1986 [JP] Japan .................................. 61-118408

[51] Int. Cl.$^5$ .............................................. G08J 3/00
[52] U.S. Cl. ................................ 523/322; 522/332; 522/342
[58] Field of Search ...................... 523/322, 332, 342

[56] References Cited

U.S. PATENT DOCUMENTS 3,415,772 12/1968 La Heij et al. ...................... 523/332
4,323,519 4/1982 Mori et al. .

FOREIGN PATENT DOCUMENTS 2174670 10/1973 France .
59-088924 5/1984 Japan .

*Primary Examiner*—Joseph L. Schofer
*Assistant Examiner*—Peter D. Mulcahy
*Attorney, Agent, or Firm*—Sughrue, Mion, Zinn, Macpeak & Seas

[57] ABSTRACT

A process for producing a low-particle-content transparent thermoplastic resin solution, which comprises centrifuging a solution of a transparent thermoplastic resin containing free water to separate it into a resin solution phase, an aqueous phase and an intermediate layer, and separating the resin solution phase from the aqueous phase and the intermediate layer. By this process, the number of particles having a size of at least 0.5 $\mu$m in the resin solution can be decreased to 10,000 or less, preferably substantially zero, per gram of the transparent thermoplastic resin.

6 Claims, No Drawings

PROCESS FOR PRODUCING A LOW-PARTICLE-CONTENT TRANSPARENT THERMOPLASTIC RESIN SOLUTION

CROSS-REFERENCE TO THE RELATED APPLICATION

This application is a continuation-in-part application of Application Ser. No. 07/006,203 filed on Jan. 3, 1987, now abandoned entitled "Process for producing a low dust transparent thermoplastic resin solution", now pending.

FIELD OF THE INVENTION

This invention relates to a novel process for producing a highly pure transparent thermoplastic resin solution from which particles have been removed markedly. More specifically, it relates to a process for producing a low-particle-content transparent thermoplastic resin solution, which can easily reduce the amount of particles having a size of at least 0.5 μm to 10,000/g or less of solid resin, and under most preferred operating conditions, can reduce it to substantially zero/g of solid resin which is difficult to achieve by conventional microfilters.

BACKGROUND OF THE INVENTION

Heretofore, removal of fine particles from transparent thermoplastic resin has relied on, for example, use of microfiltered reaction materials including monomers, catalysts, solvents, etc., or microfiltration of a prepared resin solution or a solution obtained by redissolving the produced resin in a solvent.

These methods require use of a very precise filter set to remove fine particles by filtration. When the resin solution is to be filtered, the pressure drop in filtration becomes higher as its viscosity becomes higher. This leads to the defect that the amount of the resin solution to be treated decreases, and the filtration efficiency is poor. Filters are naturally blocked up by particles, and in order to perform efficient purification by filtration, the filters must be frequently exchanged, and moreover, the amount of the resin solution to be filtered is very large. A method improved in both operation and cost has therefore been sought heretofore.

In the purification of a transparent thermoplastic resin solution containing a substantially water-immiscible solvent, a centrifugal separating method is used in the prior art to separate the resin solution from water used for washing. Usually, the purpose of this centrifugal separation is to separate from the resin solution phase the washing water which is used to remove the unreacted monomers, catalyst and other water-soluble impurities in the resin solution. In this operation, an intermediate layer exists between the resin solution phase and the washing water phase (=aqueous phase) which are centrifuged.

In this case, the manner is employed such that the intermediate layer between the resin solution phase and the aqueous phase is handled as the resin solution phase side, and water washing and centrifugation are repeated.

The reasons for this are as follows. Since the water-soluble impurities are usually dissolved in the resin solution in amounts corresponding to the distribution ratio, the operation is essential to lower the concentrations thereof successively, thereby decreasing the water-soluble impurities. Further, the thickness of the intermediate layer increases with increasing the residual amount of the water-soluble impurities, and in the event that those impurities are withdrawn as an aqueous phase, the yield greatly lowers (although varying depending on the residual amount of the water-soluble impurities, in the case of a general step of removing unreacted monomers, catalyst and other water-soluble impurities by washing with water, if all of intermediate layer is handled as an aqueous phase side, 10% or more of yield reduction occurs), and also load of waste water treatment increases remarkably.

The atmosphere of the conventional centrifugal operation does not essentially require an environment where a specific particle control has been made. Air generally contains at least 1 million/cft of particles, and at least 100,000/cft of particles are present in the atmosphere of conventional production process. The resin solution is charged electrostatically during moving it through pipes and the like, and even if a slight amount of air contacts with the resin solution, the resin is contaminated with a large number of particles. However, the resin is conventionally processed under such environmental atmosphere and used, and there is no problem on transparency, safety, etc. of the resin in conventional use manner or purpose of use.

As is apparent from various literature references, conventional centrifugation is a step of efficiently remove water-soluble impurities through an operation of separating an aqueous solution from a resin solution phase by centrifugation, and is merely considered a method for practicing an operation of standing separation or the like with good producibility.

Therefore, conventional centrifugation is not recognized as an operation which removes particle as in the process of the present invention. Further, whether or not the operation is effective to remove particle can be first determined by testing a centrifugal separation operation under atmosphere where specific particle control has been made and investigating in detail the particle number in each of phases centrifuged.

Thus, in the conventional centrifugation, in order to achieve removal of water-soluble impurities and high yield of resin simultaneously, the intermediate layer is handled as a resin solution side, and the conventional centrifugation is not substantially an effective method as a removal method of particle. Moreover, the centrifugal force, the separation treatment time, etc. for removal of free water are naturally insufficient for the purpose of particle removal.

SUMMARY OF THE INVENTION

The present inventors have found in the course of thoroughly analyzing and examining the process of manufacturing polycarbonate resins with regard to the reduction of particles that the distribution of particles during purification of a resin solution by water washing decreases in an intermediate layer between an aqueous phase and a resin solution..phase, the resin solution phase, and the aqueous phase, in the order stated. This finding has now led to the present invention.

Accordingly, an object of this invention is to provide a process for producing a low-particle-content transparent thermoplastic resin solution, which comprises centrifuging a solution of a transparent thermoplastic resin containing free water to separate it into a resin solution phase and an aqueous phase, and separating the resin solution phase from the aqueous phase and the intermediate layer between them.

In a preferred embodiment, the transparent thermoplastic resin is selected from the group consisting of polystyrene, styrene/acrylate copolymer, styrene/maleic anhydride copolymer, styrene/maleimide copolymer, styrene/ maleic anhydride/maleimide copolymer, acrylic resins, acrylate/polycarbonate block copolymers, styrene/polycarbonate block copolymer, styrene/maleic anhydride/polycarbonate copolymer, styrene/maleimide/polycarbonate copolymer, styrene/ maleic anhydride/maleimide/polycarbonate copolymer, polycarbonate, and polyphenylene oxide, and a solution of the resin having a viscosity of 10 to 3,000 cp, preferably 50 to 300 cp, is continuously centrifuged at a centrifugal force of at least 3,000 G (wherein G is the acceleration of gravity which is 9.80665 m/S$^2$), preferably at least 5,000 G. The treated solution is transferred to a standing vessel where it is left to stand to separate it into a resin solution phase, an intermediate layer, and an aqueous phase. As a result, a low-particle-content transparent thermoplastic resin solution is produced, which has 10,000 particles/gram or less of the transparent thermoplastic resin, and in a most preferred embodiment, substantially zero/g of solid resin.

DETAILED DESCRIPTION OF THE INVENTION

The transparent thermoplastic resin solution to be treated in accordance with this invention is a solution of a transparent thermoplastic resin obtained by a solution polymerization method using a substantially water-immiscible solvent, or a solution of a produced solid resin in a substantially water-immiscible solvent. Examples of the solution are solutions of various transparent thermoplastic resins having a viscosity of 10 to 3,000 cp, preferably 50 to 300 cp and a resin concentration of 1 to 50%, preferably 10 to 25%, by weight based on the weight of the solution. The resins have a viscosity average molecular weight (Mv) of $1 \times 10^3$ to $200 \times 10^3$. Specific examples of the transparent thermoplastic resins are polystyrene, styrene/acrylate copolymers, styrene/maleic anhydride copolymer, styrene/maleimide copolymer, styrene/ maleic anhydride/maleimide copolymer, acrylic resins, acrylate/polycarbonate block copolymers, styrene/polycarbonate block copolymer, styrene/maleic anhydride/polycarbonate copolymer, styrene/maleimide/polycarbonate copolymer, styrene/maleic anhydride/maleimide/ polycarbonate copolymer, polycarbonate, and polyphenylene oxide. Of these, the resins other than acrylic resins and polyphenylene oxide are preferred.

The solvent may be any substantially water-immiscible solvent which dissolves these transparent thermoplastic resins and separates from the aqueous phase. Preferred solvents have lower solubilities in water, and a large difference in specific gravity from water. Aliphatic hydrocarbons or aromatic hydrocarbons are used. They may, for example, be chlorinated aliphatic or aromatic hydrocarbons such as methylene chloride, 1,1-dichloroethane, chlorobenzene and chlorotoluene. For the resins such as polystyrene, styrene/methyl methacrylate copolymer, styrene/maleic anhydride copolymer, styrene/maleimide copolymer, styrene/ maleic anhydride/maleimide copolymer and polyphenylene oxide, aromatic hydrocarbons such as benzene, toluene or xylene are preferred. For the resins such as acrylic resins, acrylate/polycarbonate block copolymer, polystyrene/ polycarbonate block copolymer, styrene/maleic anhydride/ polycarbonate copolymer, styrene/maleic anhydride/maleimide/ polycarbonate copolymer and polycarbonate, aliphatic hydrocarbons such as methylene chloride are preferred and halogenated aliphatic hydrocarbons re particularly preferred.

The "pure water" as referred to in this invention is used to remove fine particles from the resin solution, and naturally, it preferably has the lowest possible particle content. Pure water having a low particle content as a result of microfiltration, etc. is naturally preferred. Pure water obtained by conventional ion exchange which usually has a particle content of 500 to 1,000/cc or less may be used in an early stage of a separation operation carried out in a multiplicity of phase-separating steps or when thorough removal of the particles is not necessary.

As required, the pure water is mixed with the transparent thermoplastic resin solution to form a transparent thermoplastic resin solution containing free water, and the solution is subjected to the centrifugal separation in accordance with this invention.

The amount of the free water (separable water) whose presence in the solution is effective to decrease the particles is usually at least 0.5 part by weight, preferably at least 1 part by weight, per 100 parts by weight of the resin solution, from the standpoint of phase separability. There is no particular upper limit, but for economic reasons, its amount should be small, usually 200 parts by weight or less, especially preferably from 5 to 35 parts by weight, per 100 parts by weight of the resin solution.

The transparent thermoplastic resin solution containing free water is centrifuged to separate it into a resin solution phase and an aqueous phase, and the resin solution phase is separated from the intermediate layer and the aqueous phase to prepare a low-particle-content transparent thermoplastic resin solution.

Centrifugation is carried out to separate the resin solution phase and the aqueous phase more strictly than in the prior art. Investigations of the present inventors (see Examples 1 and 2 given hereinbelow) have led to the presumption that when a solution of the transparent thermoplastic resin solution containing a large amount of free water is subjected to phase separation, it looks as if it was separated into a resin solution phase and an aqueous phase, but fine particles of water are dispersed in the resin solution phase and also the resin solution is dispersed in fine particle form in the aqueous phase, and that large amounts of particles exist in the dispersed water portion of the resin solution. The centrifugal separation in accordance with this invention is carried out for the purpose of removing the free water dispersed in fine particulate form efficiently from the resin solution and to reduce the content of the particles.

The resin solution phase and the aqueous phase separated by centrifugation are maintained in the separate state even during conveyance by ordinary pipes or other means substantially free from a stirring operation unless they are mixed by, for example, stirring. By ordinary standing, they can be easily separated from each other. To increase the operating efficiency of the centrifuge, therefore, it is preferred to transfer the centrifuged solution to a standing vessel, leave it to stand therein to separate it into phase, and to separate the intermediate layer and the aqueous phase from the resin solution phase.

The centrifuge used may be those ordinarily used. From the standpoint of the treating efficiency, they are continuously operable at a centrifugal force of 3,000 G or more and preferably 5,000 G or more. One centrifuging operation and one phase-separating operation will suffice if a sufficient centrifugal force can be used. When the centrifugal force is insufficient or it is desired to increase the treating efficiency, it is also preferred to repeat the separating operations two or more times to decrease the particles successively.

The standing vessel for leaving the centrifuged solution to stand may be any ordinary vessel used for this purpose.

Although the present invention achieves decreasing of particles by centrifugation, it is possible, if desired, to use filtration on a conventional microfilter jointly. This can be practiced industrially by considering economy and operability.

The following Examples illustrate the present invention more specifically. Unless otherwise indicated, all percents, parts, ratios and the like are by weight.

EXAMPLE 1

A methylene chloride solution of a polycarbonate resins obtained by interfacial polymerization from 2,2-bis-(4-hydroxyphenyl)propane (hereinafter referred to as "BPA") as a main raw material was extracted with alkali. The organic phase was neutralized with phosphoric acid, and then washed with water once.

The resulting solution had a content of particles having a size of at least 0.5 μm (hereinafter referred to as "a fine particle number") of 30,000/g of solid resin, a viscosity of 180 cp, a polycarbonate (Mv=20,000) concentration of 17%, a pH of 3.5 and a free water content of 0.6 part per 100 parts of the resin solution.

The solution was treated by a centrifuge with a residence time of 10 minutes under the conditions shown in Table 1, and then the amount of particles having a size of at least 0.5 μm was examined at the resin solution phase, the intermediate layer (since in this example, the amount of free water was small, the aqueous phase was also dealt with as the intermediate layer), and the entire wall surface. The results obtained are shown in Table 1 below.

The amount of the resin was 200 g. The number of fine particles was measured by using a fine particle counter made by HIAC-ROYCO Co. The number of fine particles in the intermediate layer was measured by using . measuring samples taken from the resin solution phase and the aqueous phase. The results showed that almost all fine particles were present in the intermediate layer on the aqueous phase side.

In the tables, the number of fine particles (*1) was in accordance with the following standards.
Starting resin solution: number/g of polycarbonate resin
Intermediate layer: number/cc of intermediate layer solution
Entire wall surface: the number of fine particles adhered to the entire wall surface
Aqueous phase: number/cc of aqueous phase.

The balance of the number of fine particles is not 100%, but such a degree of variations in balance is tolerable in view of the present state of art.

TABLE 1

|  | Test No. | | |
|---|---|---|---|
|  | 1-(1) | 1-(2) | 1-(3) |
| Centrifugal force (G) | 180 | 4,700 | 9,000 |
| Resin concentration (wt %) | 17 | 17 | 17 |
| Number of fine particles: | | | |
| Starting resin solution | 30,000 | 30,000 | 30,000 |
| After centrifugation: | | | |
| Resin solution | 26,000 | 6,000 | 3,000 |
| Intermediate layer | 200 million | 390 million | 560 million |
| Entire wall surface | 76,000 | 75,000 | 73,000 |

EXAMPLE 2

Example 1 was repeated except that a solution obtained by mixing the same polycarbonate resin solution as in Example 1 with 50 parts, per 100 parts of the resin solution, of ultrapure water (10 particles/cc) was used as the starting solution. The results obtained are shown in Table 2 below.

TABLE 2

|  | Test No. | | | |
|---|---|---|---|---|
|  | 2-(1) | 2-(2) | 2-(3) | 2-(4) |
| Centrifugal force (G) | 180 | 4,700 | 4,700 | 9,000 |
| Resin concentration (wt %) | 17 | 17 | 17 | 17 |
| Number of fine particles (*1) | | | | |
| Starting resin solution | 30,000 | 30,000 | 30,000 | 30,000 |
| After centrifugation: | | | | |
| Resin solution | 11,000 | 2,700 | 370 | 0 |
| Intermediate layer | 20,000 | 30,000 | 70,000 | 90,000 |
| (Thickness of intermediate layer (mm)) | (15) | (2) | (2) | (1) |
| Aqueous phase | 10,000 | 10,000 | 5,000 | 2,400 |

It is understood from Table 2 that if washing and centrifugation are carried out using pure water, a sufficient centrifugal force and a sufficient time can give a resin solution containing substantially zero fine particle number/g of solid resin. With increasing centrifugal force, the number of particles tends to decrease both in the resin solution phase and the aqueous phase and the particles tend to gather concentratingly in the intermediate layer. The thickness of the intermediate layer decreases as the centrifugal force becomes large. From this tendency and the measurement of the number of fine particles in the intermediate layer in Example 1, it is presumed that most of the fine particles adhere in great amounts to the free water in the resin solution or in the free resin solution in the aqueous phase, and with increasing centrifugal force, these particles move to the intermediate layer and thus result in an increased number of particles in the intermediate layer.

EXAMPLE 3

Example 1 was repeated except that a solution obtained by mixing the same polycarbonate resin solution as used in Example 1 with 100 parts per 100 parts of the resin solution, of ultrapure water (10 particles/cc) was used, and the centrifugation time was varied. The results obtained are shown in Table 3 below.

TABLE 3

|  | Test No. | | | |
|---|---|---|---|---|
|  | 3-(1) | 3-(2) | 3-(3) | 3-(4) |
| Centrifugal force (G) | 4,700 | 4,700 | 4,700 | 9,000 |
| Centrifugation time (minutes) | 0.5 | 2.0 | 5.0 | 10.0 |

TABLE 3-continued

| | Test No. | | | |
|---|---|---|---|---|
| | 3-(1) | 3-(2) | 3-(3) | 3-(4) |
| Resin concentration (wt %) | 17 | 17 | 17 | 17 |
| Number of fine particles (*1) | | | | |
| Starting resin solution | 30,000 | 30,000 | 30,000 | 30,000 |
| After centrifugation: | | | | |
| Resin solution | 25,000 | 20,000 | 5,000 | 3,000 |
| Intermediate layer | 15,000 | 16,000 | 30,000 | 30,000 |
| Aqueous phase | 5,000 | 5,000 | 10,000 | 10,000 |

EXAMPLE 4

Each of an acrylic resin (general-purpose brand name PMMA (VH) made by Mitsubishi Rayon Co., Ltd.; hereinafter referred to as "PMMA"), polystyrene resin (brand name Diarex HH 102 made by Mitsubishi-Monsanto Co., Ltd.; hereinafter referred to as "PS"), styrene/methyl methacrylate copolymer (brand name "Estyrene MS-600" made by Shin Nittetsu Chemical Co., Ltd.; to be referred to as "MS"), styrene/maleic anhydride copolymer (brand name "Dylark 232" made by Sekisui Chemical Industry Co., Ltd.; hereinafter referred to as "S-MA") and styrene/polycarbonate copolymer having styrene grafted at the terminals (styrene content 20%; hereinafter referred to as "S-PC") was dissolved in methylene chloride to a concentration of 15%.

The number of fine particles in the solution was as shown in Table 4 below.

One hundred grams of the solution was mixed with 100 g of ultrapure water (2.7 fine particles/cc) for 0.5 minute with stirring. The mixture was treated by a centrifuge at a centrifugal force of 4,700 G for 20 minutes, and then transferred to another vessel. The number of particles having a size of at least 0.5 μm was examined in the resin solution phase, the intermediate layer and the aqueous phase. The results obtained are shown in Table 4 below.

Since the PMMA solution had low phase-separability, the above measurement was made after it was additionally centrifuged at a centrifugal force of 9,000 G for 20 minutes. Furthermore, because of the low phase-separability of A solution, the measured numbers of fine particles in the intermediate layer and the aqueous phase might have been excessive.

TABLE 4

| | Type of the Resin | | | | |
|---|---|---|---|---|---|
| | PMMA | PS | MS | S-MA | S-PC |
| Number of Fine Particles* | | | | | |
| Starting resin solution | 2.5 | 4.0 | 2.5 | 13.0 | 9.0 |
| Other centrifugation | | | | | |
| Resin solution | 0.4 | 0.4 | 0.5 | 1.0 | 0.8 |
| Intermediate layer | 40.0 | 12.5 | 8.0 | 25.0 | 21.0 |
| (Thickness of intermediate layer (mm)) | (20) | (2) | (2) | (5) | (2) |
| Aqueous phase | 10.0 | 0.6 | 0.6 | 1.5 | 1.2 |

*× 10$^4$

EXAMPLE 5

Each of the PS, MS and S-MA resin solutions used in Example 4 was mixed with 50 g (per 100 g of the resin solution) of ultrapure water with stirring for 5.0 minutes. The resulting emulsion was centrifuged in the same way as in Example 4 at a centrifugal force of 9,000 G and varying residence times in the centrifuge. The results obtained are shown in Table 5 below.

TABLE 5

| | Type of the Resin | | | | | |
|---|---|---|---|---|---|---|
| | PS | | MS | | S-MA | |
| Residence Time (minutes) | 2 | 10 | 2 | 10 | 2 | 10 |
| Number of Fine Particles* | | | | | | |
| Starting resin solution | 4.0 | 4.0 | 2.5 | 2.5 | 13.0 | 13.0 |
| After centrifugation | | | | | | |
| Resin solution | 0.3 | 0 | 0.3 | 0 | 0.8 | 0.2 |
| Intermediate layer | 13.0 | 15.0 | 8.0 | 9.0 | 26.0 | 29.0 |
| Aqueous phase | 0.6 | 0.6 | 0.6 | 0.5 | 1.6 | 1.5 |

*× 10$^4$

It is seen that the same explanation as made with regard to the results given in Table 2 can be applied to the results given in Table 5.

EXAMPLE 6

Each of 10% polyphenylene oxide and PS resin solutions was mixed with 100 ml (per 100 ml of the resin solution) of ultrapure water. The resulting mixture was centrifuged in the same way as in Example 4 at a centrifugal force of 4,700 G for 20 minutes. The results obtained are shown in Table 6 below.

TABLE 6

| | Type of the Resin | |
|---|---|---|
| | Polyphenylene Oxide | PS |
| Number of Fine Particles* | | |
| Starting resin solution | 71 | 290 |
| After centrifugation | | |
| Resin solution | 0.35 | 0.00 |
| Intermediate layer | 1.9 | 11.7 |
| Aqueous phase | 7.1 | 2.4 |

*× 10$^4$

The reason that the particle number in the starting resin solution is very large is that polyphenylene oxide and polystyrene which are the conventional molding materials being not subjected to particle control were used, and the reason that the particle balance differs is that almost all of particles were adhered on the wall of the centrifugal machine.

The following advantages can be obtained in the preferred embodiments of the process of this invention for producing a low-particle-content transparent thermoplastic resin solution as can be seen from the foregoing statement including working examples.

(1) Since a conventional microfilter is substantially unnecessary for the purification of the resin solution, a complicated filtering operation is not required.

(2) The conventional microfilter is necessary for the production of pure water. However, the operation of filtering water is easy, and the amount of water can be smaller than the resin solution.

(3) A resin solution containing 10,000 or less particles having a size of at least 0.5 μm g of solid resin can be easily obtained.

(4) A resin solution having substantially zero particle/g of solid resin can be obtained by the preferred embodiment of this invention. Such a resin solution cannot be easily obtained by using a microfilter.

Since the operation for decreasing particles is easy and economical, the process of this invention is not limited to special uses such as optical uses and can also be applied to ordinary transparent thermoplastic resin materials.

While the invention has been described in detail and with reference to specific embodiments thereof, it will be apparent to one skilled in the art that various changes and modifications can be made therein without departing from the spirit and scope thereof.

What is claimed is:

1. A process for producing a low-particle content transparent thermoplastic resin solution, which comprises centrifuging a solution of a transparent thermoplastic resin containing free water in an amount of at least 0.5 part by weight per 100 parts by weight of the resin solution, at a centrifugal force of at least 3,000 G, to separate it into resin solution phase, intermediate layer and an aqueous phase, and recovering the resin solution phase from the aqueous phase and the intermediate layer.

2. The process as in claim 1, wherein the transparent thermoplastic resin is selected from the group consisting of polystyrene, styrene/acrylate copolymer, styrene/maleic anhydride copolymer, styrene/maleimide copolymer, styrene/ maleic anhydride/maleimide copolymer, acrylic resins, acrylate/polycarbonate block copolymers, styrene/polycarbonate block copolymer, styrene/maleic anhydride/polycarbonate copolymer, styrene/maleimide/polycarbonate copolymer, styrene/maleic anhydride/maleimide/polycarbonate copolymer, polycarbonate, and polyphenylene oxide.

3. The process as in claim 1, wherein the resin solution has a viscosity in the range of 50 to 300 cp.

4. The process as in claim 1, wherein the resin solution centrifuged continuously is conveyed to a standing vessel where the resin solution phase is separated from the aqueous phase and the intermediate layer.

5. The process as in claim 1, wherein the number of particles having a size of at least 0.5 μm in the resulting low-particle-content transparent thermoplastic resin solution is 10,000/g or less of the transparent thermoplastic resin.

6. A process for producing a low-particle content transparent thermoplastic resin solution, which comprises centrifuging a solution of a transparent thermoplastic resin from which unreacted monomers, catalyst and other water-soluble impurities have been substantially removed, said solution containing free water in an amount of at least 0.5 part by weight per 100 parts by weight of the resin solution, at a centrifugal force of at least 3,000 G, to separate it into resin solution phase, intermediate layer and an aqueous phase, and recovering the resin solution phase from the aqueous phase and the intermediate layer.

* * * * *